United States Patent
Kang et al.

(10) Patent No.: US 9,032,043 B2
(45) Date of Patent: May 12, 2015

(54) METHOD AND APPARATUS FOR SHARING CONTENT

(75) Inventors: Tae-young Kang, Seoul (KR); Yeon-hee Lee, Seoul (KR); Sang-ok Cha, Daegu (KR)

(73) Assignee: Samsung Electronics Co., Ltd. (KR)

( * ) Notice: Subject to any disclaimer, the term of this patent is extended or adjusted under 35 U.S.C. 154(b) by 490 days.

(21) Appl. No.: 13/188,047

(22) Filed: Jul. 21, 2011

(65) Prior Publication Data

US 2012/0023191 A1 Jan. 26, 2012

(30) Foreign Application Priority Data

Jul. 21, 2010 (KR) .................. 10-2010-0070472

(51) Int. Cl.
*G06F 15/16* (2006.01)
*G06F 17/30* (2006.01)

(52) U.S. Cl.
CPC ..... *G06F 17/30038* (2013.01); *Y10S 707/9994* (2013.01)

(58) Field of Classification Search
USPC ............... 709/217–219, 231; 707/999.01; 713/150
See application file for complete search history.

(56) References Cited

U.S. PATENT DOCUMENTS

| 8,417,677 B2* | 4/2013 | Nagoya et al. ............. 707/694 |
| 2006/0136399 A1 | 6/2006 | Conwell et al. |
| 2007/0061835 A1* | 3/2007 | Klein et al. ................ 725/25 |
| 2007/0073767 A1* | 3/2007 | Springer et al. .......... 707/103 R |
| 2008/0189294 A1* | 8/2008 | Cha ........................ 707/10 |
| 2008/0189298 A1* | 8/2008 | Cha ........................ 707/10 |
| 2009/0055377 A1* | 2/2009 | Hedge et al. ................ 707/5 |
| 2010/0125512 A1* | 5/2010 | Jones et al. ................ 705/27 |
| 2010/0146115 A1* | 6/2010 | Bezos ..................... 709/225 |
| 2011/0058516 A1* | 3/2011 | Small et al. ............... 370/328 |
| 2012/0260298 A1* | 10/2012 | Chen et al. ................ 725/114 |

FOREIGN PATENT DOCUMENTS

| JP | 2006-101157 | 4/2006 |
| JP | 2009-015535 | 1/2009 |
| KR | 100706875 | 4/2007 |
| KR | 1020070086806 | 8/2007 |
| KR | 1020090020005 | 2/2009 |

OTHER PUBLICATIONS

Australian Search Report dated Nov. 6, 2013 issued in a counterpart application No. 2011280409.

* cited by examiner

*Primary Examiner* — Ario Etienne
*Assistant Examiner* — Kidest Mendaye
(74) *Attorney, Agent, or Firm* — The Farrell Law Firm, P.C.

(57) ABSTRACT

A method and an apparatus for sharing content are provided. Information about at least one content is transmitted to an external device. Information about associated content that have been searched for by the external device based on the transmitted information about the at least one content is received from the external device. Content to share with a second user device are selected from among the associated content based on a predetermined condition. Information about the selected content is transmitted to the second user device.

25 Claims, 15 Drawing Sheets

METHOD AND APPARATUS FOR SHARING CONTENT

PRIORITY

This application claims priority under 35 U.S.C. §119(a) to Korean Patent Application No. 10-2010-0070472, filed on Jul. 21, 2010, in the Korean Intellectual Property Office, the disclosure of which is incorporated herein by reference.

BACKGROUND OF THE INVENTION

1. Field of the Invention

The present invention relates generally to methods and apparatuses for sharing content, and more particularly, to a method and apparatus for sharing content among user devices.

2. Description of the Related Art

Due to the recent development of communication technologies, users can access massive amounts of content. However, as the amount and kind of content increase, users have difficulties in selecting desired content.

To address the problem, a variety of methods have been suggested in which users can share their favorite content with other users.

SUMMARY OF THE INVENTION

The present invention has been made to address at least the above problems and/or disadvantages and to provide at least the advantages described below. Accordingly, an aspect of the present invention provides a method and apparatus for efficiently sharing content among user devices.

According to an aspect of the present invention, a method is provided for sharing content in first user device. Information about at least one content is transmitted to an external device. Information about associated content that have been searched for by the external device based on the transmitted information about the at least one content is received from the external device. Content to share with a second user device are selected from among the associated content based on a predetermined condition. Information about the selected content is transmitted to the second user device.

According to another aspect of the present invention, a method is provided for sharing content. Information about at least one content is received from a first user device. Associated content are searched for based on the received information about the at least one content. Information about the associated content is transmitted to the first user device. Identification information about selected content, selected by the first user device based on a predetermined condition, is received from the first user device. Access information about the selected content is transmitted to a second user device, based on the identification information.

According to an additional aspect of the present invention, an apparatus is provided for sharing content in a first user device. The apparatus includes a first transmitter for transmitting information about at least one content to an external device. The apparatus also includes a receiver for receiving, from the external device, information about associated content that have been searched for by the external device based on the transmitted information about the at least one content. The apparatus further includes a selecting unit for selecting content to share with a second user device from among the associated content based on a predetermined condition. Additionally, the apparatus includes a second transmitter for transmitting information about the selected content to the second user device.

According to a further aspect of the present invention, an apparatus is provided for sharing content. The apparatus includes a first receiver for receiving information about at least one content from a first user device. The apparatus also includes a searching unit for searching for associated content based on the received information about the at least one content. The apparatus additionally includes a first transmitter for transmitting information about the associated content to the first user device. The apparatus further includes a second receiver for receiving from the first user device identification information about selected content, selected by the first user device based on a predetermined condition. The apparatus also includes a second transmitter for transmitting access information about the selected content to a second user device, based on the identification information.

According to another aspect of the present invention, a computer-readable storage medium is providing having programs embodied thereon for carrying out a method of sharing content in a first user device. The method includes transmitting information about at least one content to an external device; receiving, from the external device, information about associated content that have been searched for by the external device based on the transmitted information about the at least one content; selecting content to share with a second user device from among the associated content based on a predetermined condition; and transmitting information about the selected content to the second user device.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
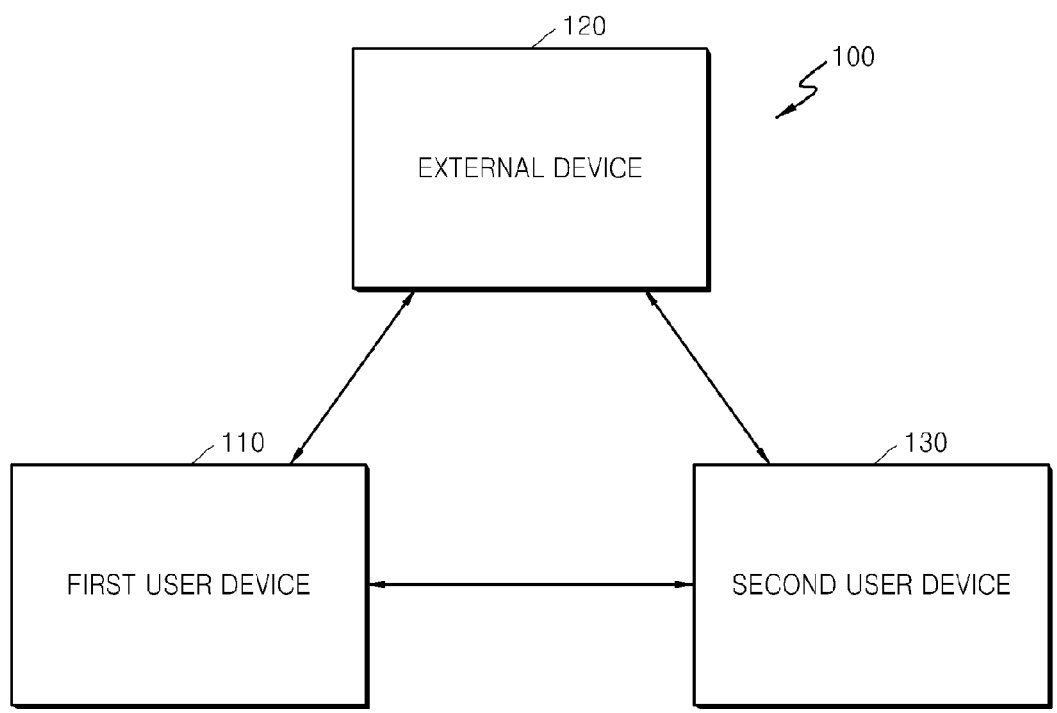
FIG. 1 is a block diagram of a system for sharing content, according to an embodiment of the present invention.

Embodiments of the present invention are described in detail below with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a block diagram of a system 100 for sharing content, according to an embodiment of the present invention. The system 100 for sharing content includes a first user device 110, an external device 120, and a second user device 130. It is assumed that the first user device 110 wishes to share at least one content with the second user device 130.

The first user device 110 transmits information about the at least one content (e.g., identification information) to the external device 120. The external device 120 searches for associated content about the at least one content, based on the information, and transmits the search results to the first user device 110. The first user device 110, in turn, selects final content to share with the second user device 130 from among the received search results, and then transmits information about the selected content (e.g., identification and access information thereof) to the second user device 130. The second user device 130 performs operations, such as, accessing a website that provides corresponding content, based on the received information about the selected content, and receiving the content by downloading, streaming or purchasing the content from the website.

Sharing encrypted content or a large amount of content with another user device has traditionally been very difficult. However, according to embodiments of the present invention, the encrypted content or large amount of content can be easily shared with another user device by searching for associated content about the content that are difficult to be directly shared, and allowing the other device to obtain the associated content.

Detailed descriptions about the first user device 110, the external device 120, and the second device 130 of the system 100 for sharing content are provided below with reference to FIGS. 2 to 4.

Figure 2:
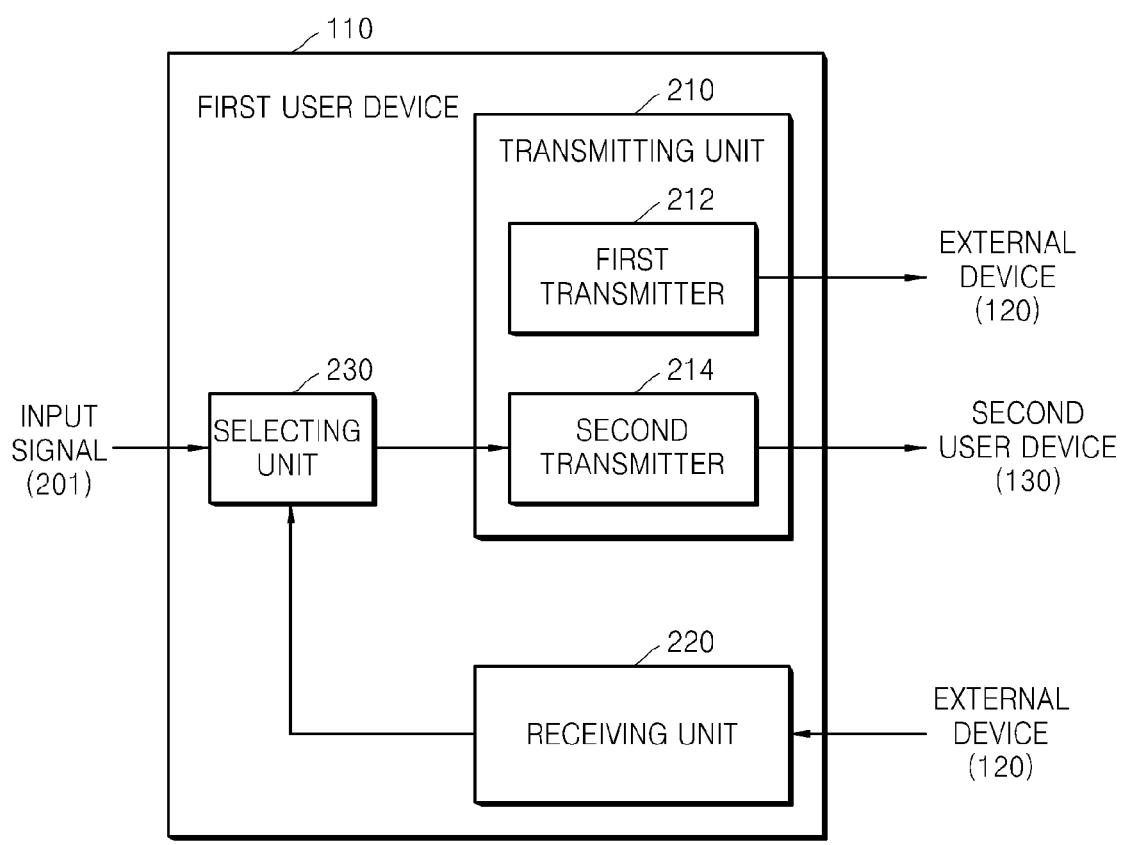
FIG. 2 is a block diagram of first user device of the system for sharing content, according to an embodiment of the present invention.

FIG. 2 is a block diagram of the first user device 110 of the system 100 for sharing content, according to an embodiment of the present invention. In this embodiment of the present invention, the first user device 110 includes a transmitting unit 210, a receiving unit 220, and a selecting unit 230.

The transmitting unit 210 may further include a first transmitter 212 for communicating with the external device 120, and a second transmitter 214 for communicating with the second user device 130. In FIG. 2, the first and second transmitters 212 and 214 are shown as separate modules, but they may be combined into a single module if they use the same communication method or if the single module supports two or more communication methods.

The first transmitter 212 transmits information about at least one content to the external device 120. The information about the at least one content may include any kind of information required to search for associated content. For example, the first transmitter 212 may transmit identification information about the at least one content to the external device 120.

The receiving unit 220 receives information about the associated content that have been searched for by the external device 120 based on the information transmitted by the first transmitter 212. For example, the receiving unit 220 may receive metadata about the found associated content from the external device 120.

The selecting unit 230 selects content to share with the second user device 120 from among the associated content, based on a predetermined condition. The selecting unit 230 may include first and second selecting units, and a display unit.

The first selecting unit may select content to be included in a list of recommended associated content from among the associated content, according to the predetermined condition. The external device 120 may search for associated content about one content. The information about the associated content includes metadata, such as, the number of recommendations, the number of references, information about content type, etc. The first selecting unit may first select content expected to be preferred by a user based on the metadata. The user may set or change such predetermined conditions according to his/her taste.

An output unit outputs the list of recommended associated content through a display or a speaker.

The second selecting unit may select final content to share with the second user device 130 from among content included in a content list, in response to an input signal 201 from the user. Specifically, when the user requests to change a content included in the list of recommended associated content, the second selecting unit changes the list of recommended associated content to include a content the user desires. When the user finally approves the list of recommended associated content, the content included in the list of recommended associated content are finally selected.

The second transmitter 214 transmits information about selected content to the second user device 130. The second transmitter 214 may transmit the information about selected content directly to the second user device 130, or via the external device 120 to the second user device 130.

In the former case, the second transmitter 214 has to transmit access information required to access the selected content directly to the second user device 130. However, in the latter case, the second transmitter 214 may transmit only identification information about the selected content to the external device 120. In this case, the external device 120 checks which content the first user device 110 has selected, based on the identification information, and then transmits the access information about the selected content to the second user device 130.

The second user device 214 may also transmit at least one of identification information about the first user device 110, information about a player used to play the selected content, and the content list including the selected content to the external device 120 or the second user device 130.

Figure 3:
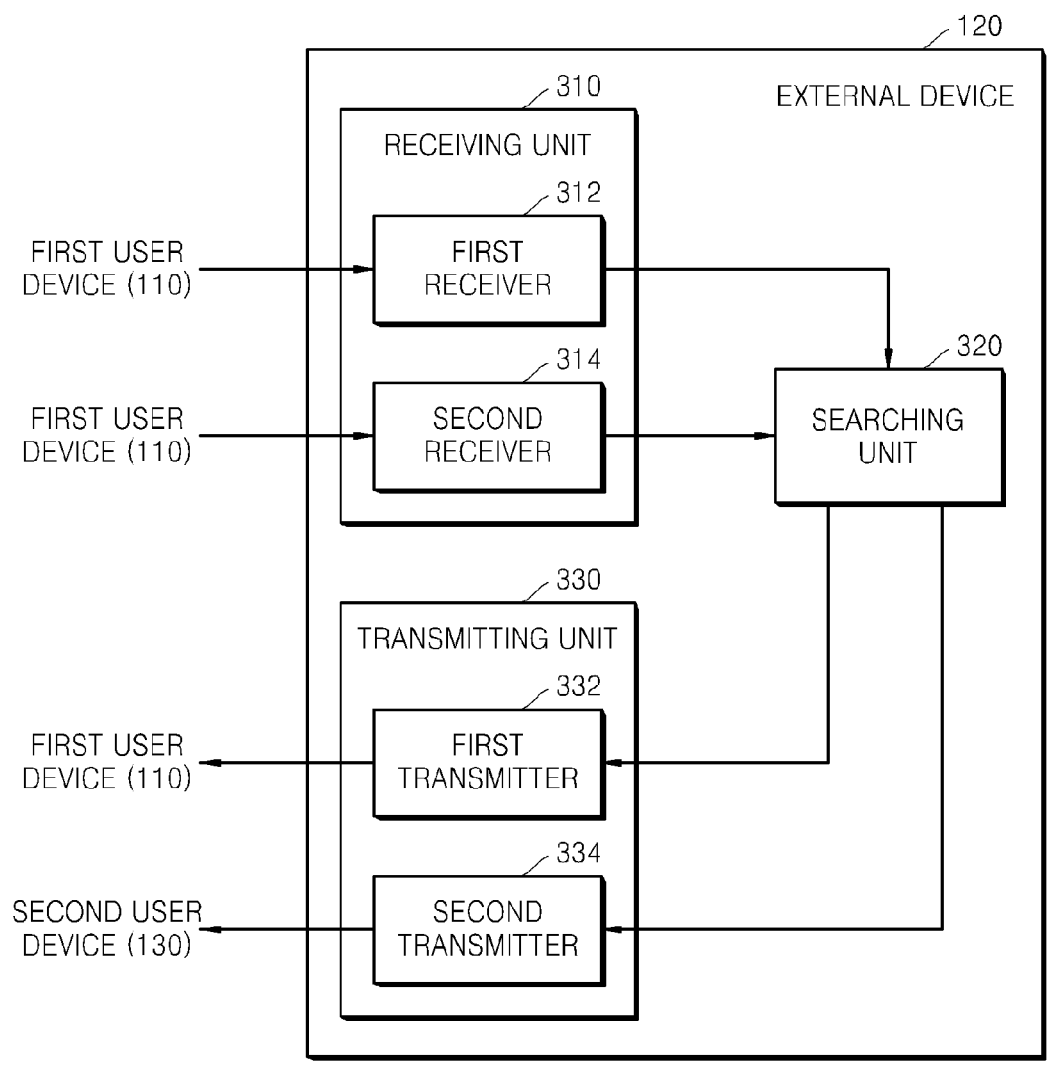
FIG. 3 is a block diagram of an external device of the system for sharing content, according to an embodiment of the present invention.

FIG. 3 is a block diagram of the external device 120 of the system 100 for sharing content, according to an embodiment of the present invention. In this embodiment of the present invention, the external device 120 includes a receiving unit 310, a searching unit 320, and a transmitting unit 330.

The receiving unit 310 may include first and second receivers 312 and 314, and the transmitting unit 330 may include first and second transmitters 332 and 334. The first and second receivers 312 and 314, and the first and second transmitters 332 and 334 may be implemented as separate modules, respectively, or may be implemented in a unified module.

The first receiver 312 receives, from the first user device 110, the information about the at least one content, such as the identification information, to be used to search for the associated content.

The searching unit 320 searches for the associated content based on the received information. For example, if the first receiver 312 received identification information about an encrypted music content, the searching unit 320 may search for non-encrypted music video content related to the encrypted music content, and if the first receiver 312 received identification information about a large sized movie content, the searching unit 320 may search for smaller sized trailer content associated with the movie.

The first transmitter 332 transmits the information about the associated content to the first user device 110. The information about the associated content may include metadata about corresponding content and access information, such as, a Uniform Resource Locator (URL).

The second receiver 314 receives information about content selected by the first user device 110 from the first user device 110. The selected content are selected from among the associated content according to a predetermined condition. The second receiver 314 may check final content selected by the first user device 110, based on the received information.

The second transmitter 334 transmits access information about final content selected by the first user device 110 to the second user device 130. The second transmitter 334 may further transmit at least one of identification information about the first user device 110, a content list including the final content, and information about a player used to play the final content to the second user device 130.

Figure 4:
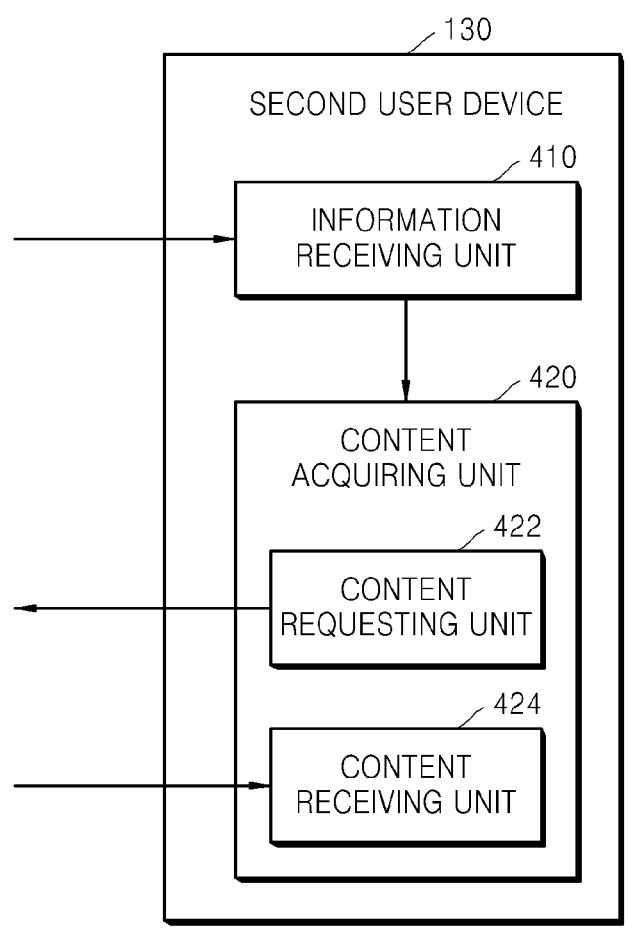
FIG. 4 is a block diagram of second user device of the system for sharing content, according to an embodiment of the present invention.

FIG. 4 is a block diagram of the second user device 130 of the system 100 for sharing content, according to an embodiment of the present invention. In this embodiment of the present invention, the second user device 130 includes an information receiving unit 410 and a content acquiring unit 420.

The information receiving unit 410 receives, from the first user device 110 or the external device 120, the information about the selected final content (hereinafter, information about final content).

The information about final content may be information about content finally selected by the first user device 110 to be shared with the second device 130 from among the associated content that have been searched for by the external device 120 based on the information about the at least one content.

The information about final content may include identification information for identifying the final content, access information for accessing the final content, metadata about the final content, etc. Alternatively, in other embodiments of the present invention, in order for a playlist having the final content to be automatically created, the information about final content may include information about a player used to play the final content.

The content acquiring unit 420 acquires content based on the access information included in the final content. The content acquiring unit 420 may include a content requesting unit 422 and a content receiving unit 424.

The content requesting unit 422 transmits a request to a content server to transmit content based on a request by a user of the second user device 130 who selects at least one final content. Information received by the information receiving unit may include a website's URL, and the content requesting unit 422 accesses the website based on the URL to request to transmit content.

The content receiving unit 424 receives content from the content server. The content receiving unit 424 receives the content by a downloading or streaming method.

The second user device 130 may further include a playlist creating unit. The playlist creating unit creates a playlist that includes final content based on the information about final content. The information about final content may include information about a player that has been used by the first user device 110 to play the final content. If the second user device 130 has the same player as used by the first user device 110, the second user device 130 automatically creates the playlist that the player supports.

Figure 5:
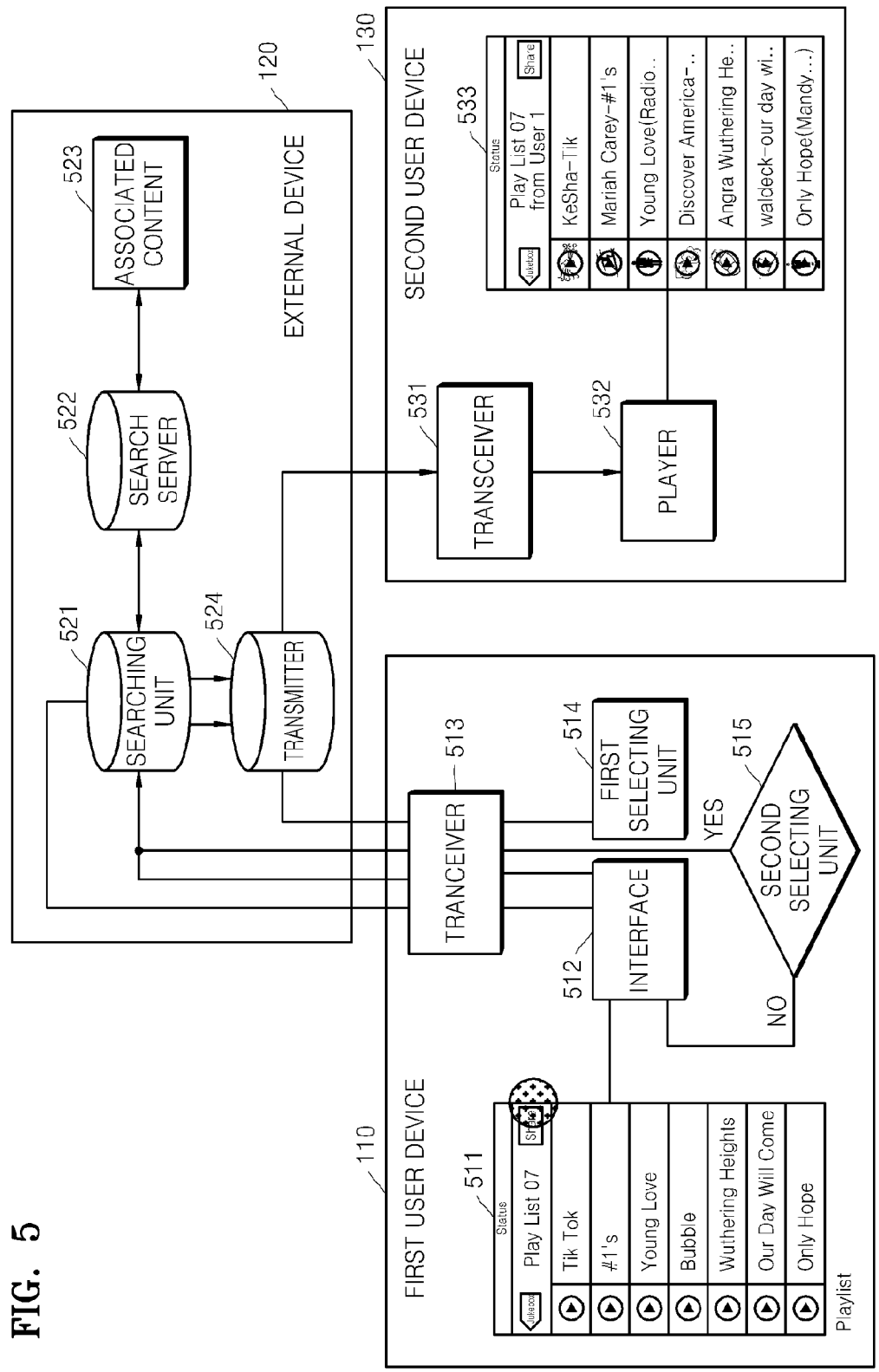
FIG. 5 is a block diagram of a system for sharing content, according to another embodiment of the present invention.

FIG. 5 is a diagram of a system for sharing content, according to another embodiment of the present invention. In FIG. 5, operations of the system for sharing content are described sequentially in time.

A user of the first user device 110 may select at least one content included in a playlist 511 through an interface 512.

A transceiver 513 transmits information about the at least one content to the external device 120.

A searching unit 521 in the external device 120 then searches for associated content based on the received information. The searching unit 521 first searches for content stored in the external device 120, and if no associated content are found in the external device 120, the search unit 521 searches a search server 522 for associated content 523.

A transmitter 524 in the external device 120 transmits information about the associated content 523 to the first user device 110.

Selecting units, namely, first and second selecting units 514 and 515, in the first user device 110 select content to share with the second user device 130 from among the associated content 523, based on a predetermined condition. Specifically, the first selecting unit 514 selects content according to the predetermined condition and outputs a content list including the selected content for the user, and then the second selecting unit 515 determines final content to share with the second user device 130 based on or without an input by the user.

The transceiver 513 transmits information about the final content to share with the second user device 130 to the external device 120.

The transmitter 524 in the external device 120 transmits the information about the final content to the second user device 130.

A transceiver 531 in the second user device 130 receives the information about the final content.

A player 532 in the second user device 130 obtains information about a player used to play the final content from the information about the final content, and creates a playlist 533 that the player supports.

When requested by the user of the second user device 130 to play content included in the playlist, the player 532 receives content using access information included in the information about the final content, and plays them.

Figure 6:
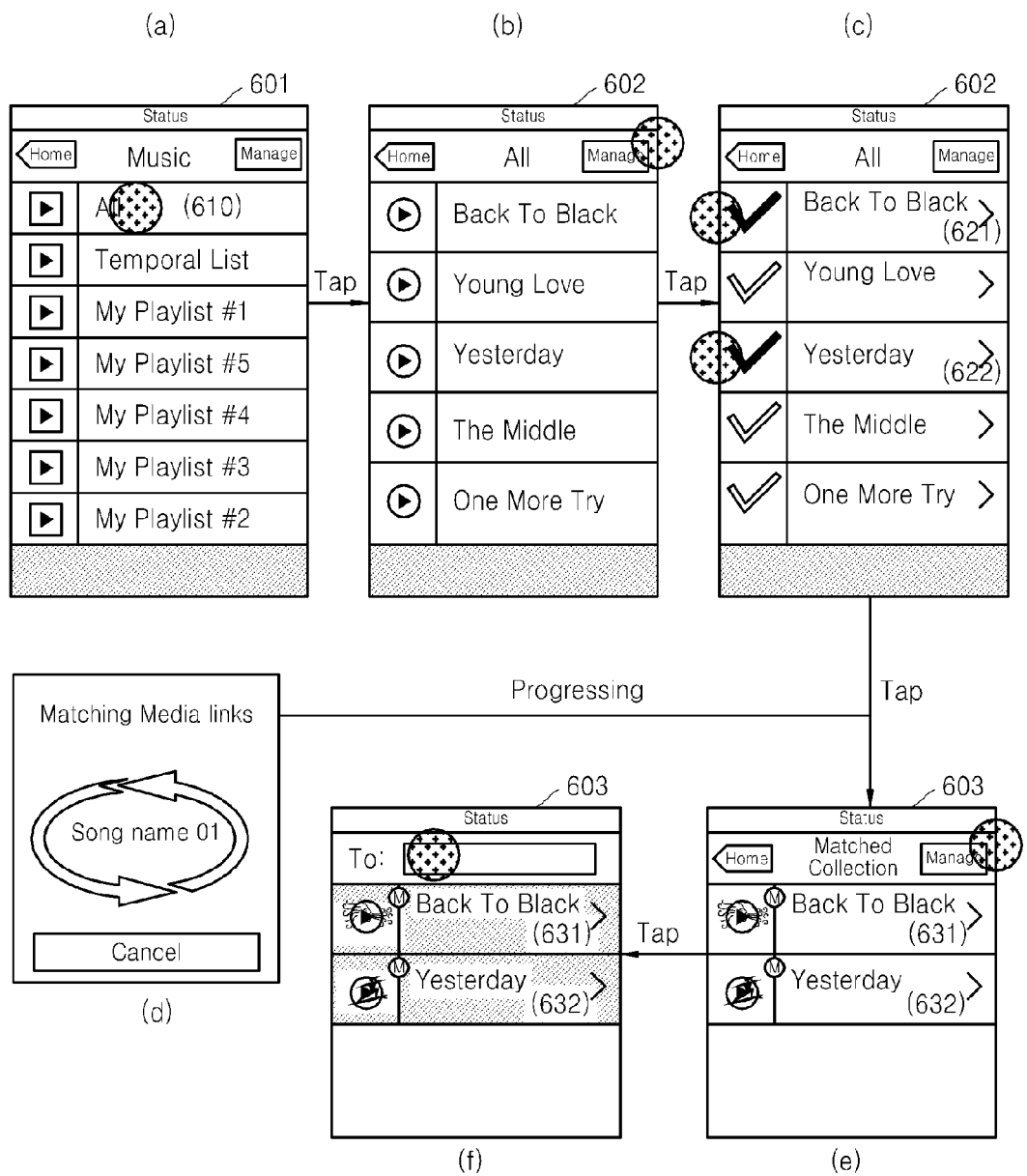
FIG. 6 is a diagram illustrating the sharing of content with the second user device in the first user device, according to an embodiment of the present invention.

FIG. 6 is a diagram illustrating the sharing of content with the second user device 130 in the first user device 110, according to an embodiment of the present invention.

In step (a) of FIG. 6, the user selected 'ALL' item 610 corresponding to all content stored in the first user device 110 from a playlist 601.

In step (b) of FIG. 6, a content list 602 including all the content corresponding to the 'ALL' item 610 is displayed.

In step (c) of FIG. 6, the user selected 'Back to Black' 621 and 'Yesterday' 622 from the content list 602.

In step (d) of FIG. 6, when the first user device 110 transmits information regarding 'Back to Black' 621 and 'Yesterday' 622 to the external device 120, the external device 120 searches for associated content regarding the 'Back to Black' 621 and 'Yesterday' 622.

In step (e) of FIG. 6, the first user device 110 receives information about the associated content regarding 'Back to Black' 621 and 'Yesterday' 622, and creates and outputs a content list 603 that includes 'Back to Black' 631 and 'Yesterday' 632, based on the received information. Here, to indicate that 'Back to Black' 631 and 'Yesterday' 632 are different from 'Back to Black' 621 and 'Yesterday' 622, a separate mark ('M' in FIG. 6E) is attached thereto.

In step (f) of FIG. 6, the first user device 110 determined to share both 'Back to Black' 631 and 'Yesterday' 632 with the second user device 130. Accordingly, information about 'Back to Black' 631 and 'Yesterday' 632 is transmitted to the second user device 130.

Figure 7:
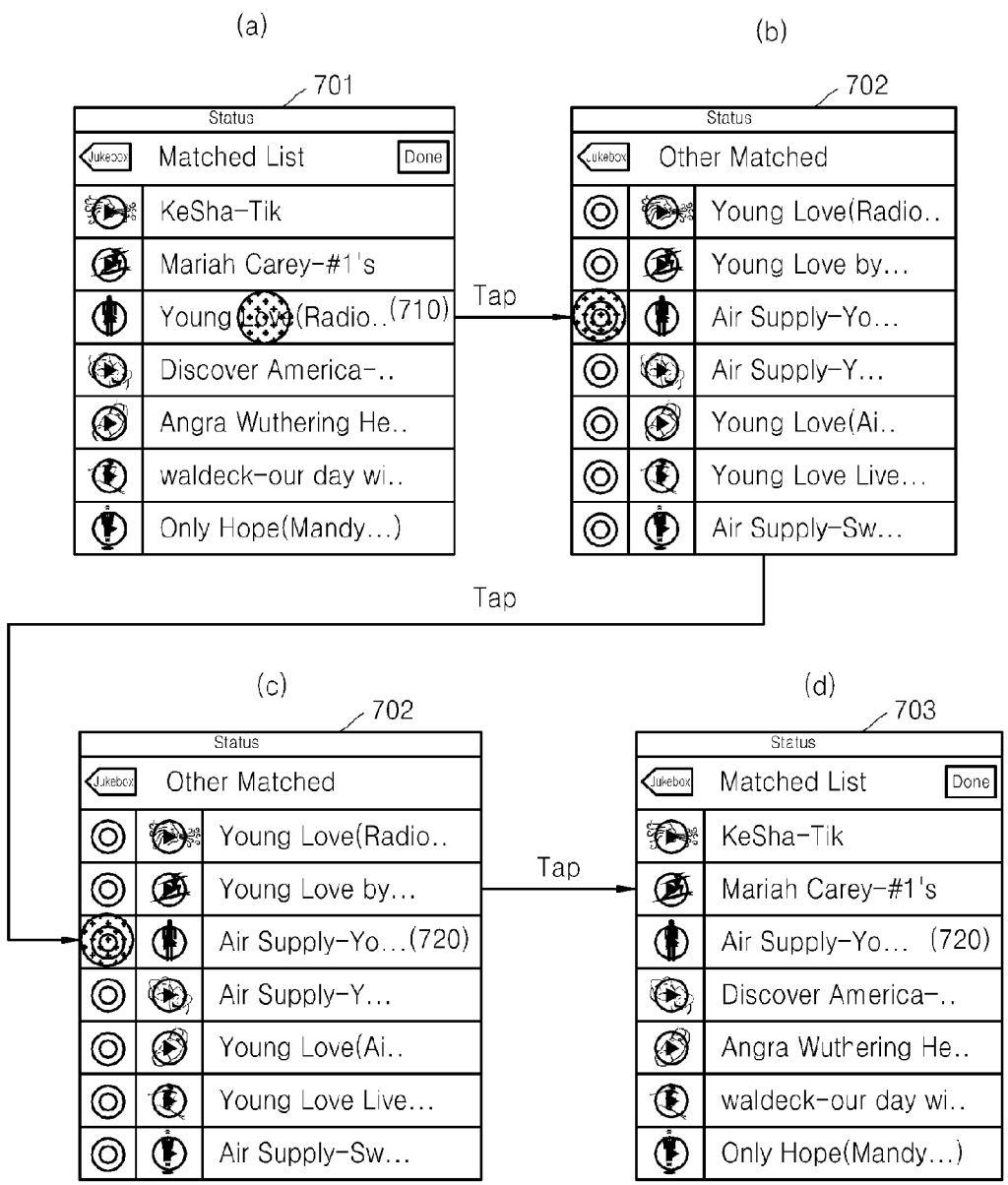
FIG. 7 is a diagram illustrating the sharing content with the second user device in the first user device, according to another embodiment of the present invention.

FIG. 7 is a diagram illustrating sharing of content with the second user device 130 in the first user device 110, according to another embodiment of the present invention.

In step (a) of FIG. 7, the first user device 110 receives information about associated content from the external device 120, and creates a list of recommended associated content 701. Content included in the list of recommended associated content 701 are not actual content but links to the actual content.

Associated content are arranged hierarchically in the list of recommended associated content 701. For example, associated content first selected by the first user device 110 based on a predetermined condition are placed on the highest hierarchical level, and non-selected associated content are placed in the lower hierarchical levels. From the list of recommended associated content 701, only the content placed on the highest hierarchical level are displayed for the user, and when requested by the user, associated content placed on the lower hierarchical levels may be displayed for the user. In addition, the user may change the list of recommend associated content 701 to include some content that were placed on the lower hierarchical level on the highest hierarchical level.

When the user selects a 'Done' button, information about the content that are included in the list of recommended associated content 701 is transmitted to the second user device 130 so that the second user device 130 may obtain the content included in the list of recommended associated content 701. However, when a user of the second user device 130 wishes to replace the list of recommended associated content 701, the user may select an associated content on the lower hierarchical level.

In step (a) of FIG. 7, the user selects 'Young Love' 710.

In step (b) of FIG. 7, a list of associated content 702 regarding 'Young Love' 710 is displayed.

In step (c) of FIG. 7, the user selected 'Air Supply-Young Love' 720 from the list of associated content 702.

In step (d) of FIG. 7, a list of associated content 703 including 'Air Supply-Young Love' 720 is displayed. Specifically, 'Young Love' 710 is included in the list 701 of step (a) while 'Air Supply-Young Love' 720 is included instead of the 'Young Love' 710 in the list 703 of step (d). The first user device 110 transmits information about content included in the list 703 to the second user device 130.

Figure 8:
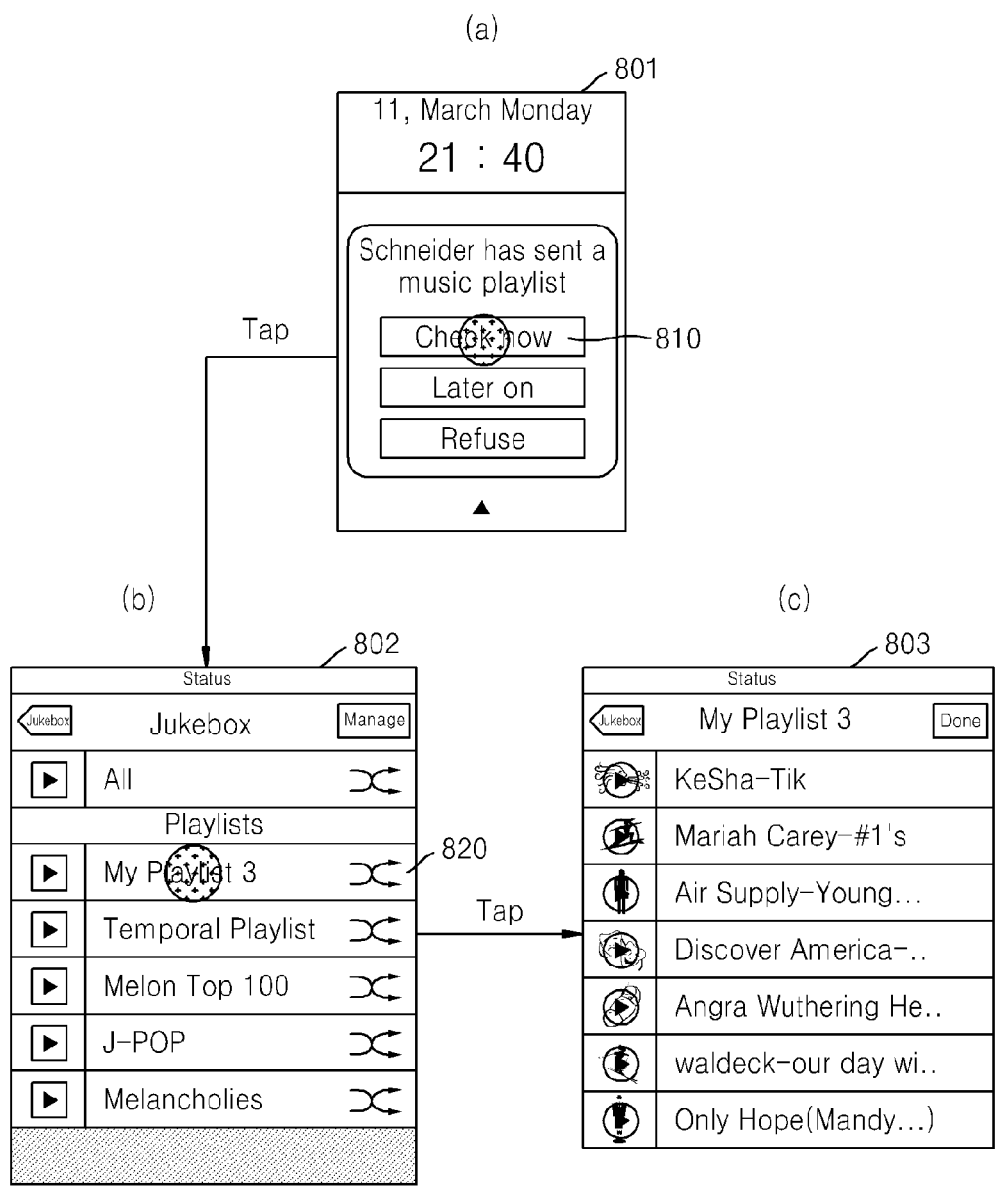
FIG. 8 is a diagram illustrating the second user device obtaining content that the first user device wishes to share, according to an embodiment of the present invention.

FIG. 8 is a diagram illustrating the obtaining of content that the first user device 110 wishes to share in the second user device 130, according to an embodiment of the present invention.

In step (a) of FIG. 8, when receiving information about final content selected by the first user device 110 from the first user device 110 or via the external device 120, the second user device 130 displays a display window 801 indicating that the information has been received. The user may select a 'Check Now' button 810 to check the information about final content.

In step (b) of FIG. 8, the second user device 130 automatically creates 'My Playlist 3' 820 based on the information about final content. The 'My Playlist 3' 820 includes the final content that have been selected by the first user device 110. The user may select the 'My Playlist 3' 820 from a playlist 802.

In step (c) of FIG. 8, a content list 803 including the final content that have been selected by the first user device 110 is displayed at the second user device 130. It can be seen that the content list 803 is identical to the content list 703, shown in FIG. 7.

Figure 9:
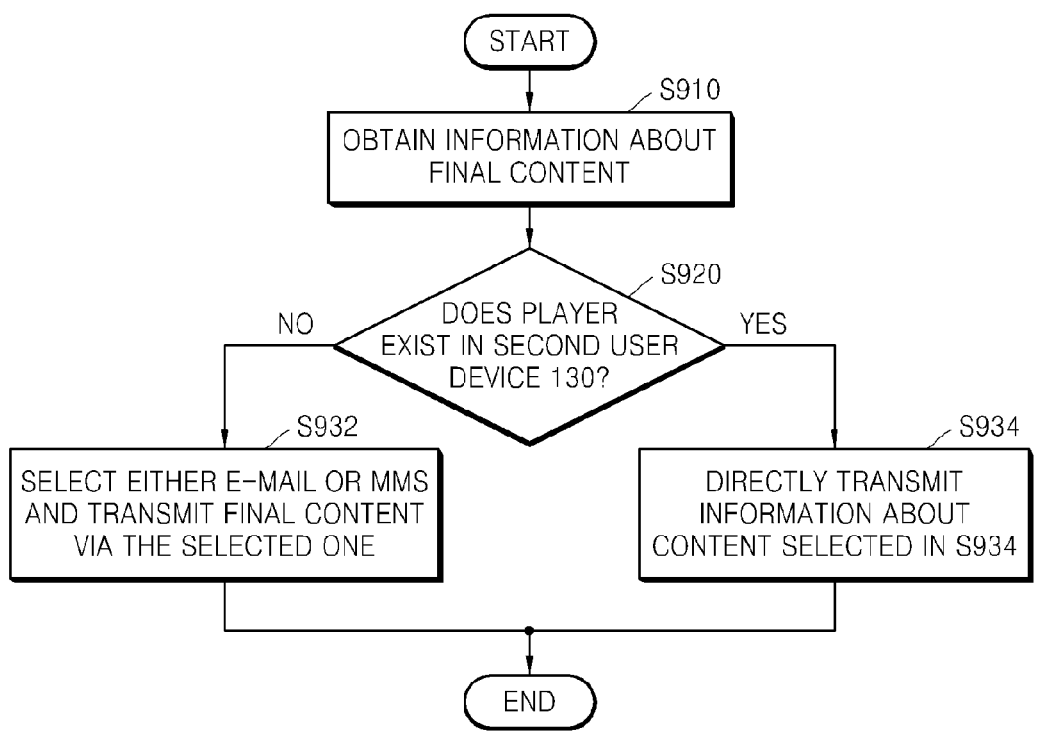
FIG. 9 is a flowchart illustrating the operation of a second transmitter of the first user device, according to an embodiment of the present invention.

FIG. 9 is a flowchart illustrating operation of the second transmitter 214 of the first user device 110, according to an embodiment of the present invention.

The second transmitter 214 obtains information about final content selected by the selecting unit 220, in step S910.

The second transmitter 214 checks if the second user device 130 has a player identical to a player that the first user device 110 uses to play the final content, in step S920. This is done for checking if the second user device 130 also supports the associated content that are supported by the first user device 110. If the second user device 130 uses the same player, the process goes to step S934. If the second user device 130 does not use the same player, the process goes to step S932.

In step S932, the second transmitter 214 selects either E-mail or MMS for transmitting the information about final content. When the second user device 130 receives the information about final content via E-mail or MMS and uses the same player that the first user device 110 uses, the second user device 130 may be provided the same content list.

In step S934, the second transmitter 214 transmits the information about final content directly to the second user device 130. Then, the second user device 130 automatically creates a playlist including the information about final content based on the received information. The information about final content may include identification information about the first user device 110, access information for accessing the final content, information about the player, metadata about the final content, etc.

Figure 10:
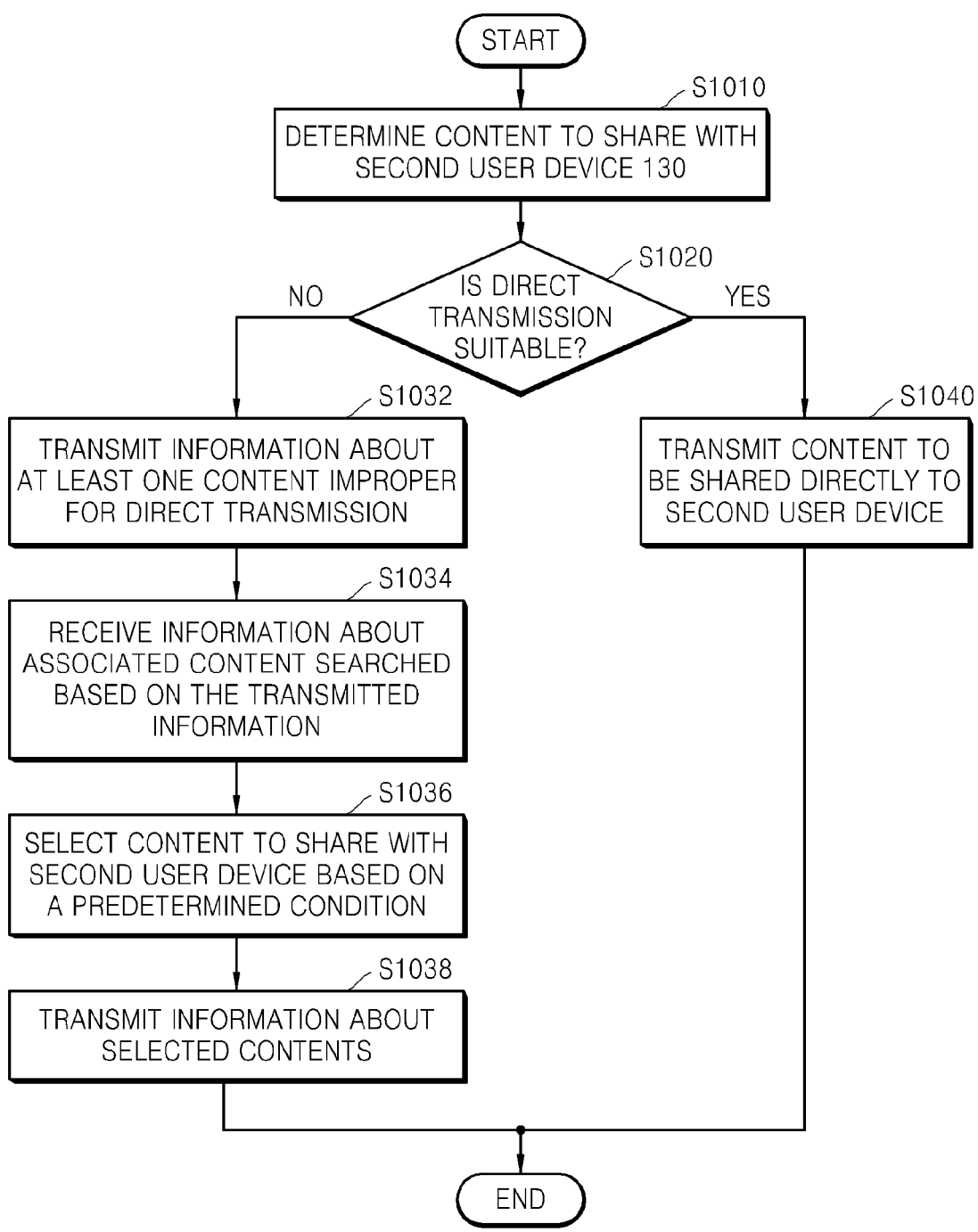
FIG. 10 is a flowchart illustrating a method of sharing content with the second user device in the first user device, according to an embodiment of the present invention.

FIG. 10 is a flowchart illustrating a method of sharing content with the second user device 130 in the first user device 110, according to an embodiment of the present invention.

The first user device 110 determines which content to share with the second user device 130 among content stored in the first user device 110, in step S1010.

The first user device 110 determines whether or not a direct transmission is proper for the content to be shared, in step S1020. Whether or not the direct transmission is proper may be determined by a user based on a predetermined condition, or may be automatically determined by the first user device 110 taking external conditions, such as, storage capacity, communication state, etc., of the second user device 130 into account. For example, encrypted content or content having a size equal to or larger than a threshold may be determined as being improper for direct transmission. If the content to be shared are proper for direct transmission, the process goes to step S1040. If the content to be shared are improper for direct transmission, information about associated content is transmitted instead, in step S1032.

In step S1032, the information about the content determined to be improper for the direct transmission is transmitted to the external device 120.

Information about associated content that has been searched for by the external device 120 based on the information transmitted to the external device 120 is received from the external device 120, in step S1034.

Content to share with the second user device 130 are selected from among the associated content based on a predetermined condition, in step S1036.

Information about the selected content is transmitted to the second user device 130, in step S1038.

The content to be shared are directly transmitted to the second user device 130, in step S1040.

Figure 11:
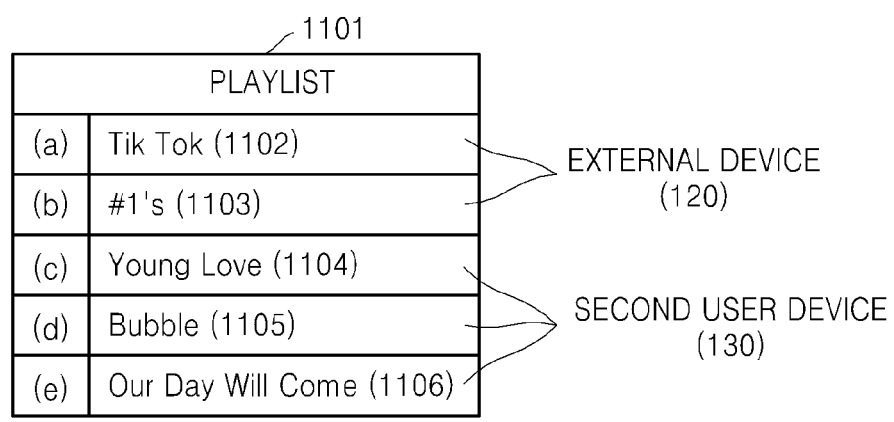
FIG. 11 is a diagram illustrating an example of sharing content stored in the first user device with the second user device, according to the embodiment of the present invention illustrated in FIG. 10.

FIG. 11 is a diagram illustrating an example of sharing content stored in the first user device 110 with the second user device 130 in the first user device 110, according to the embodiment of the present invention illustrated in FIG. 10.

The first user device 110 has five content 1102 to 1106, and it is assumed that content 'Tik Tok' 1102 and '#1s' 1103 are encrypted and thus are improper for direct transmission.

When the first user device 110 tries to share the five content 1102 to 1106 with the second user device 130, only information about associated content regarding the content 'Tick Tok' 1102 and '#1s' 1103 is transmitted to the second user device 130 in order for the second user device 130 to receive the associated content, while the remaining content 1104 to 1106 are directly transmitted to the second user device 130.

Figure 12:
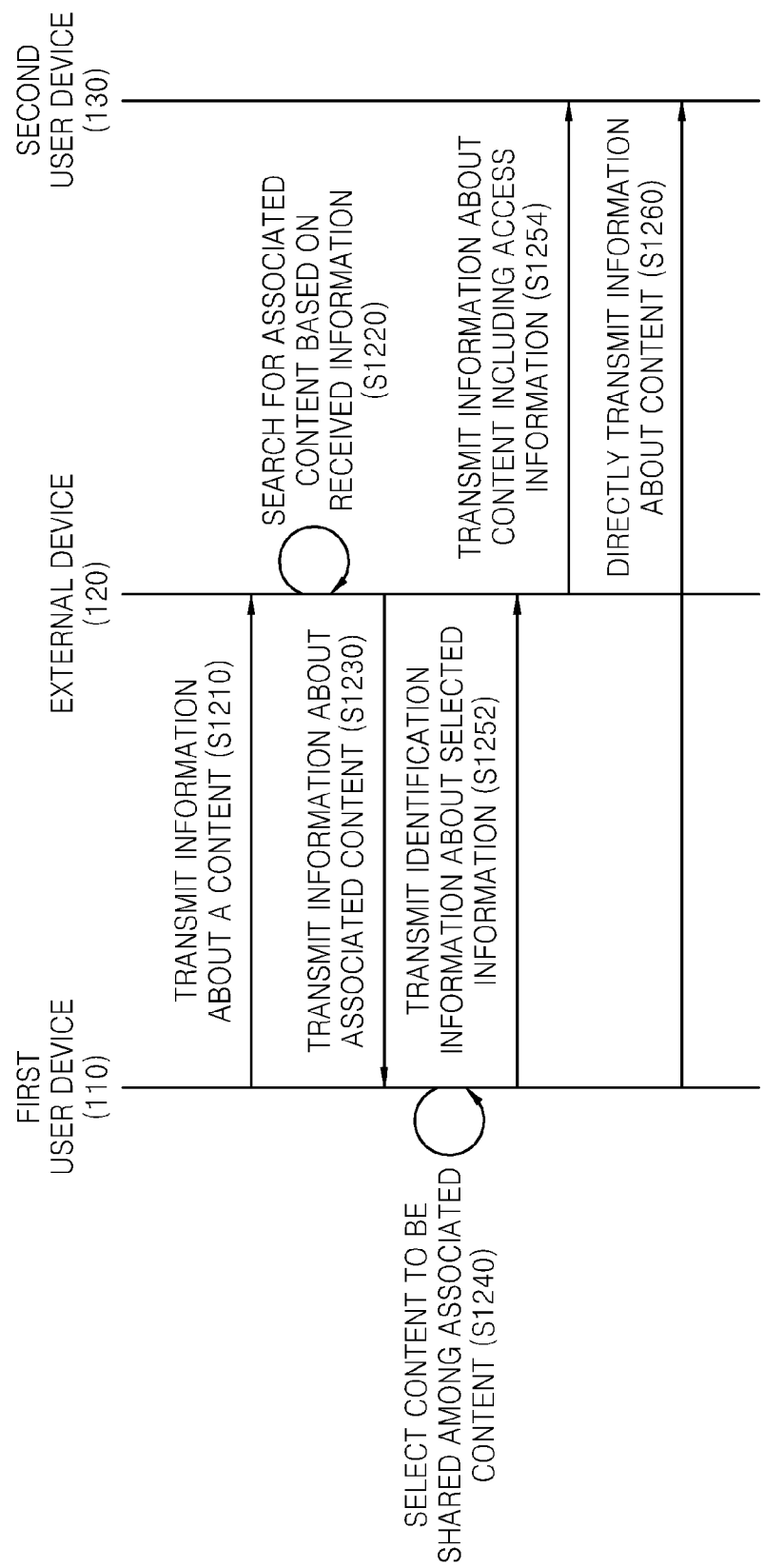
FIG. 12 is a flowchart illustrating a method of sharing content between the first and second user devices and in the system for sharing content, according to an embodiment of the present invention.

FIG. 12 is a flowchart illustrating the sharing of content between the first and second user devices 110 and 120 in the system 100 for sharing content, according to an embodiment of the present invention.

The first user device 110 transmits information about at least one content to the external device 120, in step S1210.

The external device 120 searches for associated content based on the information received from the first user device 110, in step S1220.

The external device 120 transmits information about the associated content searched for by the external device 120, in step S1230.

The first user device 110 selects content to share with the second user device 130 from among the associated content, in step S1240. The first user device 110 may transmit information about the selected content through either steps S1252 to S1254, or step S1260 below.

In step S1252, the first user device 110 transmits identification information about the selected content to the external device 120.

In step S1254, the external device 120 transmits the information about selected content, including access information, to the second user device 130, the selected content being selected by the first user device 110.

In step S1260, the first user device 110 transmits the information about selected content directly to the second user device 130.

Figure 13:
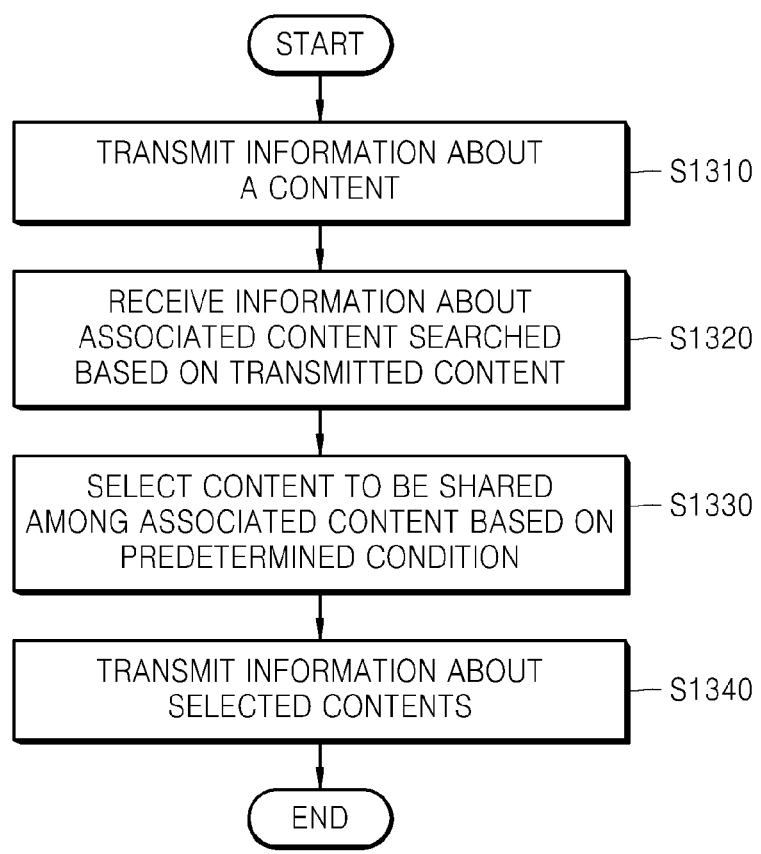
FIG. 13 is a flowchart illustrating a method of sharing content with the second user device in the first user device, according to an embodiment of the present invention.

FIG. 13 is a flowchart illustrating a method of sharing content with the second user device 130 in the first user device 110, according to an embodiment of the present invention.

In step S1310, the first user device 110 transmits information about at least one content to the external device 120.

In step S1320, the first user device 110 receives, from the external device 120, information about associated content searched for by the external device 120 based on the information transmitted in step S1310.

In step S1330, the first user device 110 selects content to share with the second user device 130 from among the associated content, based on a predetermined condition.

In step S1340, the first user device 110 transmits information about the selected content to the second user device 130.

Figure 14:
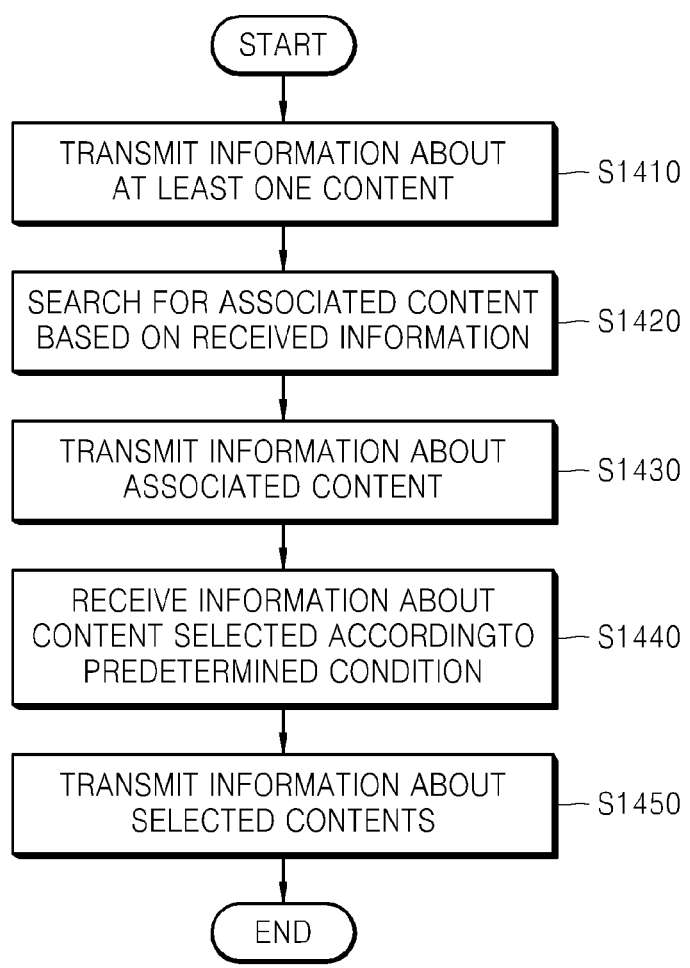
FIG. 14 is a flowchart illustrating a method of controlling content sharing between the first and second user devices in the external device, according to an embodiment of the present invention.

FIG. 14 is a flowchart illustrating a method of controlling content sharing between the first and second user devices 110 and 130 in the external device 120, according to an embodiment of the present invention.

In step S1410, the external device 120 receives information about at least one content from the first user device 110.

In step S1420, the external device 120 searches for associated content based on the information received in step S1410.

In step S1430, the external device 120 transmits information about the associated content to the first user device 110.

In step S1440, the external device 120 receives from the first user device 110 information about selected content from among the associated content by the first user device 110 based on a predetermined condition.

In step S1450, the external device 120 transmits information about the selected content to the second user device 130.

Figure 15:
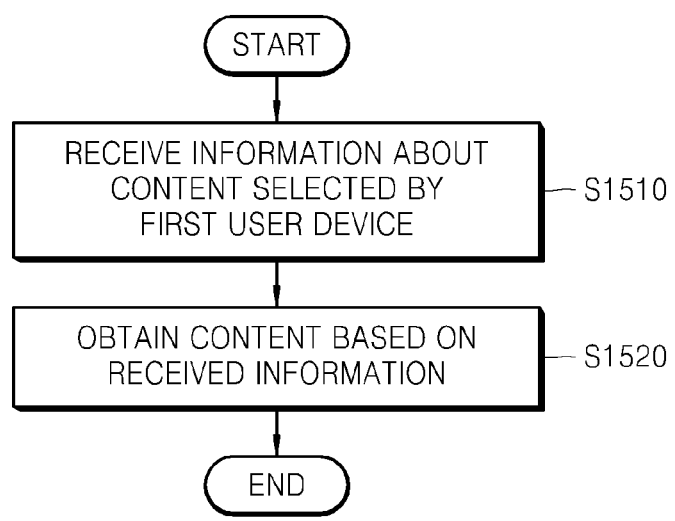
FIG. 15 is a flowchart illustrating a method of obtaining content in the second user device that the first user device wishes to share, according to an embodiment of the present invention.

FIG. 15 is a flowchart of a method of obtaining content in the second user device 130 that the first user device 110 wishes to share, according to an embodiment of the present invention.

In step S1510, the second user device 120 receives from the first user device 110 or the external device 120 information about content selected by the first user device 110 from among associated content that have been searched for by the external device 120 based on a predetermined condition.

In step S1520, the second user device 120 obtains the content selected by the first user device 110, based on the received information.

A program for carrying out the embodiments of the present invention may be implemented as computer-readable codes on a computer-readable storage medium. Examples of the computer-readable storage medium include all kinds of storage devices, which can be read by a computer system. The computer-readable storage medium are, for example, a Read Only Memory (ROM), Random Access Memory (RAM), Compact Disk-ROM (CD-ROM), magnetic tape, floppy disk, optical data storage deice, and the like. The computer-readable storage medium can also be distributed to a computer system connected to a network to be stored and executed as computer-readable program codes.

While the present invention has been shown and described with reference to certain embodiments thereof, it will be understood by those of ordinary skill in the art that various changes in form and detail may be made therein without departing from the spirit and scope of the present invention as defined by the following claims.

What is claimed is:
1. A method of sharing multimedia content in a first device comprising the steps of:
receiving, from an external device, information about associated multimedia content, which is associated with at least one multimedia content of the first device;

selecting multimedia content to share with a second device from among the associated multimedia content; and transmitting information about the selected multimedia content to the second device, wherein content of the at least one multimedia content of the first device is the same as content of the associated multimedia content, and a size of the at least one multimedia content of the first device is different from a size of the associated multimedia content, and wherein the information about the selected multimedia content is used by the second device to access the selected multimedia content.

2. The method of claim 1, wherein selecting multimedia content to share with the second device comprises:

selecting multimedia content to be included in a list of recommended associated multimedia content from among the associated multimedia content according to a predetermined condition;

outputting the list of recommended associated multimedia content; and selecting final multimedia content to share with the second device, based on a signal input by a user in response to the output list of recommended associated multimedia content.

3. The method of claim 1, wherein receiving information about the associated multimedia content comprises receiving metadata about the associated multimedia content from the external device.

4. The method of claim 1, wherein transmitting the information about the selected multimedia content to the second device comprises transmitting identification information about the selected multimedia content to the external device, such that the external device transmits access information about the selected multimedia content to the second device.

5. The method of claim 1, wherein the information about the selected multimedia content comprises identification and access information about the selected multimedia content.

6. The method of claim 1, wherein transmitting information about the selected multimedia content to the second device comprises transmitting identification information about the first device and information about a player used to play the selected multimedia content to the second device.

7. The method of claim 1, wherein the at least one multimedia content is restricted from direct transmission to the second device.

8. The method of claim 7, wherein the at least one multimedia content restricted from direct transmission to the second device comprises at least one of encrypted multimedia content or multimedia content having a size equal to or larger than a threshold.

9. A method of sharing multimedia content, the method comprising the steps of:

transmitting information about associated multimedia content, which is associated with at least one multimedia content of a first device, to the first device;

receiving, from the first device, identification information about selected multimedia content from among the associated multimedia content, selected by the first device; and transmitting access information about the selected multimedia content to a second device, based on the identification information, wherein content of the at least one multimedia content of the first device is the same as content of the associated multimedia content, and a size of the at least one multimedia content of the first device is different from a size of the associated multimedia content, and wherein the access information about the selected multimedia content is used by the second device to access the selected multimedia content.

10. The method of claim 9, wherein transmitting information about the associated multimedia content to the first device comprises transmitting metadata about the associated multimedia content to the first device.

11. The method of claim 9, wherein the at least one multimedia content comprises multimedia content restricted from direct transmission to the second device.

12. The method of claim 11, wherein the multimedia content restricted from direct transmission comprises at least one of encrypted multimedia content and multimedia content having a size equal to or larger than a threshold.

13. An apparatus for sharing multimedia content in a first device comprising:

a receiver configured to receive, from an external device, information about associated multimedia content, which is associated with at least one multimedia content of the first device;

a selecting unit configured to select multimedia content to share with a second device from among the associated multimedia content; and a transmitter configured to transmit information about the selected multimedia content to the second device, wherein content of the at least one multimedia content of the first device is the same as content of the associated multimedia content, and a size of the at least one multimedia content of the first device is different from a size of the associated multimedia content, and wherein the information about the selected multimedia content is used by the second device to access the selected multimedia content.

14. The apparatus of claim 13, wherein the selecting unit comprises, a selector configured to select multimedia content to be included in a list of recommended associated multimedia content from among the associated multimedia content according to a predetermined condition; and an output unit configured to output the list of recommended associated multimedia content, wherein, the selector is configured to select final multimedia content to share with the second device, based on a signal input in response to the output list of recommended associated multimedia content.

15. The apparatus of claim 13, wherein the receiving unit is further configured to receive metadata about the associated multimedia content from the external device.

16. The apparatus of claim 13, wherein the transmitter is further configured to transmit identification information about the selected multimedia content to the external device, such that the external device transmits access information about the selected multimedia content to the second device.

17. The apparatus of claim 13, wherein the information about the selected multimedia content comprises identification and access information about the selected multimedia content.

18. The apparatus of claim 13, wherein the transmitter is further configured to transmit either identification information about the first device, or information about a player to play the selected multimedia content to the second device.

19. The apparatus of claim 13, wherein the at least one multimedia content is restricted from direct transmission to the second device.

20. The apparatus of claim 19, wherein the at least one multimedia content restricted from direct transmission to the second device comprises at least one of encrypted multimedia content or multimedia content having a size equal to or larger than a threshold.

21. An apparatus for sharing multimedia content, comprising:
a first transmitter configured to transmit information about associated multimedia content, which is associated with the at least one multimedia content of a first device, to the first device;
a receiver configured to receive, from the first device, identification information about selected multimedia content from among the associated multimedia content, selected by the first device; and
a second transmitter configured to transmit access information about the selected multimedia content to a second device, based on the identification information,
wherein content of the at least one multimedia content of the first device is the same as content of the associated multimedia content, and a size of the at least one multimedia content of the first device is different from a size of the associated multimedia content, and
wherein the access information about the selected multimedia content is used by the second device to access the selected multimedia content.

22. The apparatus of claim 21,
wherein the first transmitter is further configured to transmit metadata about the associated multimedia content to the first device.

23. The apparatus of claim 21, wherein the at least one multimedia content comprises multimedia content restricted from direct transmission to the second device.

24. The apparatus of claim 23, wherein the multimedia content restricted from direct transmission comprises at least one of encrypted multimedia content and multimedia content having a size equal to or larger than a threshold.

25. A non-transitory computer-readable storage medium having programs embodied thereon for carrying out a method of sharing multimedia content in a first device, which comprises the steps of:
receiving, from the external device, information about associated multimedia content, which is associated with at least one multimedia content of the first device;
selecting multimedia content to share with a second device from among the associated multimedia content; and
transmitting information about the selected multimedia content to the second device,
wherein content of the at least one multimedia content of the first device is the same as content of the associated multimedia content, and a size of the at least one multimedia content of the first device is different from a size of the associated multimedia content, and
wherein the information about the selected multimedia content is used by the second device to access the selected multimedia content.

* * * * *